Feb. 26, 1963   M. W. MARTIN, JR   3,078,508
METHOD AND APPARATUS FOR BLOW MOLDING HOLLOW ARTICLES
Filed April 26, 1961
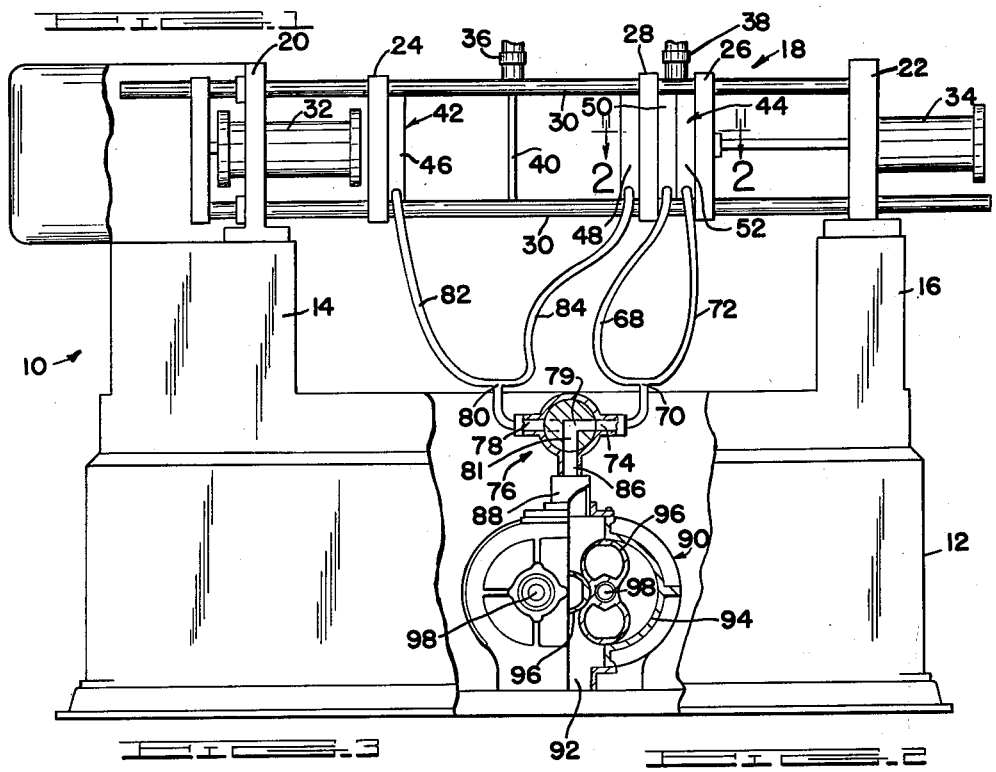
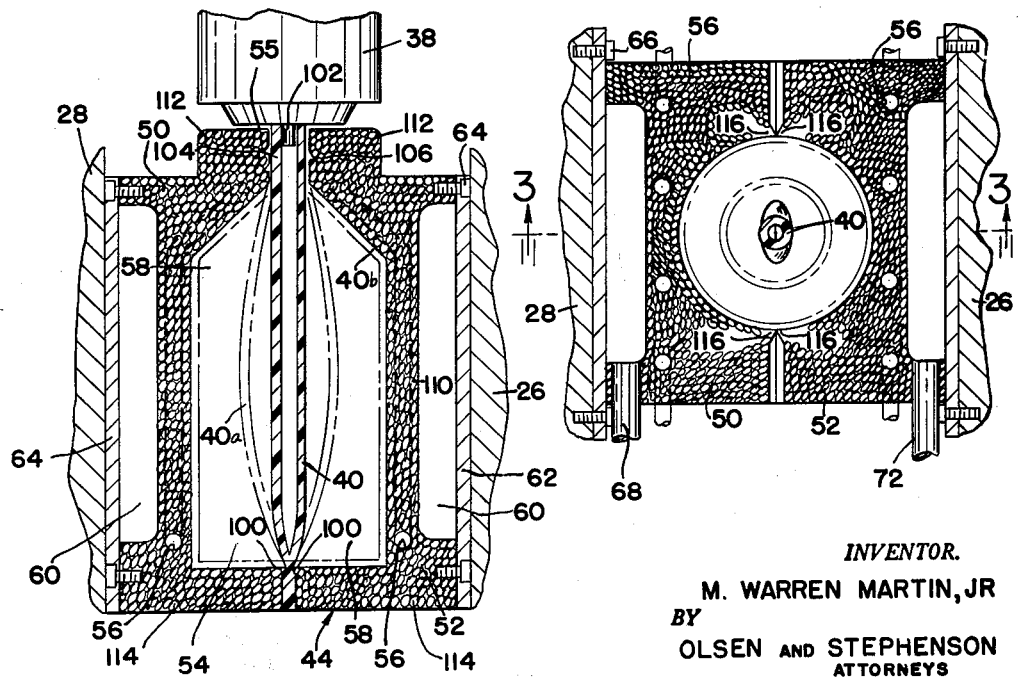
INVENTOR.
M. WARREN MARTIN, JR
BY
OLSEN AND STEPHENSON
ATTORNEYS

United States Patent Office 3,078,508  
Patented Feb. 26, 1963

3,078,508  
METHOD AND APPARATUS FOR BLOW MOLDING HOLLOW ARTICLES  
Merritt Warren Martin, Jr., Saline, Mich., assignor to Hoover Ball and Bearing Company, Ann Arbor, Mich., a corporation of Michigan  
Filed Apr. 26, 1961, Ser. No. 105,640  
5 Claims. (Cl. 18—5)

This invention relates generally to blow molding machines and more particularly to an improved method and apparatus for blow molding hollow articles.

In the blow molding of hollow plastic articles, plastic in a heated semi-fluid condition is supplied to an extrusion nozzle so that it issues from the nozzle in a tubular form. A tubular parison of a length necessary to form a desired article is formed at the extrusion nozzle, and a plurality of mold sections are moved radailly inwardly of the parison to a position in which they engage and form a mold having a cavity which surrounds the parison. One end of the parison is closed and a suitable gas, such as air, is blown into the interior of the parison so as to expand it into conformity with the mold cavity.

During expansion of the parison, the air which is in the mold cavity and surrounds the parison must be evacuated from the mold and in conventional molding practices this air must escape from the mold cavity between the mating surfaces on the mold sections. The time required for the air to escape from the mold cavity increases the time required for expanding the parison, and, if any air is trapped in the mold cavity, it makes objectionable pockets in the finished article.

The air which is injected into the parison must be supplied at a sufficiently high pressure to expand the parison as quickly as possible. This high pressure of the air increases the minimum allowable internal diameter of the parison and in turn increases the external diameter of the parison which is required to provide the amount of plastic in the parison necessary to form the desired article, such as a bottle, being molded. If the internal diameter of the parison is less than the minimum allowable size, the velocity of the blowing air flowing into the parison is likely to create a suction in a portion of the parison sufficient to close it, thereby preventing the expansion of the entire parison.

After the parison is blown into conformity with the mold cavity, a time period must be allowed for cooling of the plastic on the mold sections and this cooling is normally accomplished merely by a transfer of heat from the plastic to the mold sections which may be cooled by inserting water cooling tubes therein. Since this cooling process is relatively slow, it adversely affects the cycle time required for forming each plastic article.

It is an object of this invention, therefore, to provide an improved method and apparatus for blowing hollow plastic articles in which the cycle time required for forming each article is reduced.

It is a further object of this invention to provide apparatus for blowing hollow plastic articles which utilizes porous mold sections through which the air in the mold cavity can be evacuated and through which cooling air can be supplied to cool the mold sections and a formed plastic article therein, as well as to insure separation of the mold sections and the plastic article when desired.

A further object of this invention is to provide an improved method and apparatus for blow molding plastic articles which is capable of utilizing a smaller diameter parison in relation to the size of the article to be formed than has heretofore been possible.

Still a further object of this invention is to provide apparatus for blow molding hollow articles which utilizes molds formed of powdered metal which can be accurately and readily manufactured.

In the method and apparatus of this invention, portions of the mold sections are formed of a powdered metal which is sintered so as to bond the powder particles and provide a mold having porous portions. The mold sections are connected to a suitable blower which is operable to suck air out of the mold cavity through the porous mold portions so that this air will not retard the expansion of the parison. Furthermore during evacuation of the air from the mold cavity, the parison is partially expanded by the evacuation prior to any supply of blowing air to the parison. Due to this pre-expansion of the parison, any danger of the parison being closed by the velocity of the blowing air is avoided. Consequently, a parison of a small internal diameter can be used with the method and apparatus of this invention. This makes it possible to utilize a parison having a smaller external diameter resulting in less waste in the flash areas of the finished article and in some cases makes it possible to mold a bottle in which the parison diameter is less than the neck diameter of the bottle thereby avoiding the necessity for special apparatus for molding the neck or the trimming of excess flash from the neck. After the article has been molded in the powdered metal mold of this invention, the blower which evacuated air from the mold cavity can be reversed so as to supply air to the mold to decrease the time required for cooling of the mold and to insure separation of the molded article and the mold sections when the mold sections are moved away from the article. If desired, this rate of cooling can be increased by supplying air to the molds which has previously been cooled in a refrigerating apparatus connected to the blower. All of the above factors cooperate to reduce the cycle time required for blowing a plastic article, thereby increasing the efficiency of the blow molding machine and reducing the cost involved for manufacturing each plastic article.

Further objects, features and advantages of the invention will become apparent from a consideration of the following description, the appended claims and the accompanying drawing in which:

FIGURE 1 is a front view of a blow molding machine provided with the porous molds of this invention;

FIGURE 2 is a fragmentary horizontal sectonal view of a porous mold in the machine of this invention, looking substantially along the line 2—2 in FIG. 1; and FIGURE 3 is a vertical sectional view of a mold in the machine of this invention as seen from the line 3—3 in FIG. 2.

With reference to the drawing, the blow molding apparatus of this invention, indicated generally at 10, is illustrated in FIG. 1 as including a base 12 having a pair of horizontally spaced upstanding frame portions 14 and 16. A platen assembly, indicated generally at 18, is mounted on supports 20 and 22 carried by the frame portions 14 and 16, respectively. The platen assembly 18, which is described in detail in application Serial No. 84,306, filed January 23, 1961, owned by the assignee of this invention, includes a pair of end platens 24 and 26 and a center platen 28, mounted on a plurality of tie bars 30, only two of which are shown. A pair of hydraulic cylinder assemblies 32 and 34 are connected to the platens 24, 26 and 28 so as to move the platens alternately between the position shown in FIG. 1 in which the platens 26 and 28 are adjacent each other and the platens 24 and 26 are spaced apart and a second position in which the platens 26 and 28 are spaced apart and the platens 24 and 28 are adjacent to each other. The apparatus 10 also includes a pair of extrusion nozzles 36 and 38 which are supplied with heated plastic in a semi-fluid condition from any suitable source (not shown). Plastic is alternately extruded through the nozzles 36 and 38 so as to form downwardly extending tubular parisons 40 at the nozzles 36 and 38. When a parison 40 is being extruded at one nozzle, a hollow plastic article is being blown at the other nozzle and when the parison has been completed at the first nozzle, the extrusion of the parison at the other nozzle is commenced and the parison at the first nozzle is expanded to form a hollow plastic article.

A pair of multiple-section molds 42 and 44 correspond to the nozzles 36 and 38 and are mounted on the platen assembly 18. Each of the molds 42 and 44 consists of a pair of mold sections which are movable horizontally toward each other into engagement to form the mold. The mold 42 consists of a section 46 mounted on the end platen 24 and a section 48 mounted on one side of the center platen 28. The mold 44 consists of a first section 50 mounted on the opposite side of the center platen 28 and a second section 52 mounted on the end platen 26.

Since the molds 42 and 44 are substantially identical, only the mold 44 is described in detail herein. The mold sections 50 and 52, which are engageable to form the mold 44 so that it has a cavity 54 of a shape corresponding to the shape of the hollow plastic article to be formed in the apparatus 10 and having an upper neck opening 55, are of a sufficiently porous construction to permit the movement of air therethrough to either evacuate air from the cavity 54 or supply air to the cavity 54. In a preferred embodiment of the invention each of the mold sections 50 and 52 is formed of a powdered metal, such as a berylium-copper alloy powder, which has been compacted and sintered so as to bond the metal particles and provide a mold of porous construction. Cooling coils 56 are preferably embedded in the powdered metal prior to sintering so that a cooling fluid can be supplied to the coils 56 to assist in the cooling of the mold sections 50 and 52. A cavity 58, of a shape corresponding to substantially one half of the article to be molded is formed in one side of each of the mold sections 50 and 52 so that when they engage as shown in FIG. 3, the cavities 58 cooperate to form the mold cavity 54. The opposite side of each of the mold sections 50 and 52 is provided with a chamber 60 which is covered by a back plate 62 secured, such as by bolts 64, to the mold section 50 or 52. The back plate 62 for the mold section 52 is secured, such as by bolts 66, to the end platen 26 and the back plate 64 for the mold section 50 is similarly secured to the center platen 28.

The air chamber 60 for the mold section 50 is connected by a conduit 68 to one leg of a T-connection 70, another leg of which is connected to a second conduit 72 which is connected to the mold section 52 so as to communicate with the chamber 60 therein. The third leg of the T-connection 70 is connected to one inlet 74 on a flow control valve 76 (FIG. 1), which is illustrated as having a second inlet 78 and an outlet 86. A movable valve member 79 in the valve 76 has a passage 81 therein and is movable between a first position in which the passage 81 connects the inlet 74 and the outlet 86 (shown in solid lines in FIG. 1) and a second position (shown in broken lines in FIG. 1) in which the passage 81 connects the inlet 78 and the outlet 86. The second inlet 78 on the flow control valve 76 is connected to one leg of a T-connection 80 which has its other legs connected by lines 82 and 84 to the mold sections 46 and 48. The lines 82 and 84 communicate with chambers in the mold sections 46 and 48 corresponding to the chambers 60 in the mold sections 50 and 52 so that when air is evacuated from the conduits 82 and 84 air will be evacuated from the mold cavity formed by the mold sections 46 and 48 when they are in engagement.

The flow control valve 76 has its outlet 86 connected to the inlet 88 on a blower unit 90 which has an outlet 92 and is operable to move air from the inlet 88 to the outlet 92. The blower 90 is illustrated as including a casing 94 having a pair of impellers 96 mounted therein on parallel shafts 98. The impellers 96 rotate in opposite directions within the casing 94 and may be rotated so that air is drawn into the casing 94 through the inlet 88 and between each impeller 96 and the casing 94. As each impeller 96 continues to rotate, it opens to the outlet opening 92 and pushes the volume of air trapped between it and the casing 94 through the outlet 92. The impellers 96 may be rotated in an opposite direction so as to draw air into the outlet 92 and discharge it through the inlet 88.

In the operation of the apparatus 10 assume that a parison 40 of the desired length shown in FIG. 3 has been extruded from the nozzle 28. Further assume that the platen assembly 18 has operated to move the mold sections 50 and 52 into engagement as shown in FIGS. 2 and 3 so that a pair of lands 100 formed on the mold sections 50 and 52 at the lower end thereof have engaged opposite sides of the parison 40 and have moved these opposite sides into engagement as shown in FIG. 3 so as to close the lower end of the parison 40 without severing the parison 40. The valve element 79 in the flow control valve 76 is moved to the position shown in FIG. 1 in which the inlet 74 communicates through the valve passage 81 with the outlet 86. The blower 90 is operated to draw air into the inlet 88 and discharge it through the outlet 92 so that the air in the mold cavity 54 is sucked out of the cavity through the mold sections 50 and 52 into the air chambers 60 and through the conduits 68 and 72 and ultimately out the blower discharge opening 92. This evacuation of air from the mold cavity 54 causes the parison 40 to be expanded to the position shown in broken lines at 40a (FIG. 3). In other words, the suction created by the blower 90 lowers the pressure in the mold cavity 54 to a pressure lower than the pressure within the parison 40 so that the parison is bulbed outwardly as shown at 40a.

The blower 90 is then either turned off or the valve member 79 is moved to a third position in which the outlet 86 is blocked so that the evacuation of air from the cavity 54 is terminated. Air under pressure is then blown into the parison 40, preferably through a nozzle 102 carried by the extrusion nozzle 38 and positioned so that it extends downwardly into the upper end of the parison 40a as shown in FIG. 3. This air expands the parison 40a into conformity with the mold cavity 54 which surrounds the parison, as shown in FIG. 3, so that the parison is now of the shape shown at 40b, which is the desired shape of the hollow plastic article being molded in the apparatus 10. In the illustrated embodiment of the invention, this article is a bottle having a body provided with a reduced diameter neck 104 provided with external threads 106.

In the illustrated embodiment of the invention shown in FIG. 3, the parison 40 is of a diameter less than the diameter of the internally threaded neck opening 55. Consequently, when the blown article is removed from the mold 44 and broken off from the plastic remaining in the nozzle 38, no trimming of flash on the threads 106 is required. This is possible because, in the process of this invention in which a pre-expansion of the parison 40 is effected prior to the supply of blowing air to the parison, the internal diameter of the parison 40 does not have to be maintained above what has previously been regarded as a minimum allowable diameter necessary to prevent closing of the parison 40 by the high velocity air injected into the parison from the nozzle 102.

Following completion of the expansion of the parison 40 into the bottle 40b, the blower 90 is operated in a reverse direction and the valve 76 is returned to the position illustrated in FIG. 1 so that air is drawn into the blower 90 through the outlet opening 92 and discharged through the inlet opening 88 into the valve passageway 81 and through the conduits 68 and 72 into the mold air chambers 60. This air circulates through the porous mold sections 50 and 52 and assists in the cooling of the mold sections, which are also being cooled by a flow of cooling fluid through the coils 56. If desired, the outlet 92 for the blower 90 may be connected to suitable refrigerating apparatus (not shown) so that the air which is drawn into the blower through the outlet opening 92 for subsequent circulation through the mold sections 50 and 52 is of a lower temperature to thereby provide for a faster cooling of the mold sections 50 and 52. The cooling of the molds 50 and 52 provides for a rapid cooling of the plastic article 40b so that the time required between expansion of the parison 40 into the article 40b and the removal of the article 40b from the mold cavity 54 is reduced.

During the above sequence of operation at the extrusion nozzle 38 to form the article 40b, another parison 40 has been extruded at the nozzle 36. When the plastic article 40b has cooled sufficiently, the platen assembly 18 is actuated to move the platens 26 and 28 in a direction away from each other and to provide for movement of the platens 24 and 28 toward each other to a position in which the mold sections 46 and 48 engage and close the lower end of the parison 40 at the nozzle 36, the formation of this parison having been completed at this time. The mold cavity formed by the sections 46 and 48 surrounds the parison 40 which depends from the nozzle 36, like the cavity 54 surrounds the parison 40 shown in FIG. 3. Prior to engagement of the mold sections 46 and 48 the article 40b has been removed from the nozzle 38 and the extrusion of the next parison 40 from the nozzle 38 has commenced.

During movement of the platens 26 and 28 in directions away from each other, the mold sections 50 and 52 are withdrawn from opposite sides of the formed article 40b. The flow of cooling air through the mold sections 50 and 52 is continued during this initial withdrawal and this flow of air into the mold sections 50 and 52 provides for an impingement of the air on the article 40b so as to insure its separation from the mold sections 50 and 52. This flow of air positively prevents any danger of the article 40b adhering to either one of the mold sections 50 and 52.

As soon as the mold sections 46 and 48 have been moved into engagement, the valve 76 is moved to its position shown in broken lines in FIG. 1 in which the passage 81 communicates the blower inlet 88 and the T-connection 80 and the blower 90 is operated to evacuate the cavity in the mold 42 so as to provide for a pre-expansion of the parison 40 as illustrated in FIG. 3. The above described sequence of steps at the nozzle 38 is then repeated at the nozzle 36 concurrently with the extrusion of the parison 40 at the nozzle 38. When the blowing of the plastic article at the nozzle 36 has been completed, the platen assembly 18 is actuated to provide for a return of the platens to their positions shown in FIG. 1 and the entire sequence of steps described above is repeated. As a result, the apparatus 10 is operable continuously to form hollow plastic articles at first one nozzle 36 or 38 and then the other.

From the above description it is seen that this invention provides blow molding apparatus 10 in which the molds 42 and 44 are of a porous construction permitting a flow of air therethrough. While the molds 42 and 44 have been illustrated as being constructed entirely of a porous material such as powdered metal, it is to be understood that many of the advantages of the invention can be obtained by constructing only portions of the molds of the porous material, for example, the side portions 110 of the molds between the neck and bottom portions 112 and 114, respectively.

The porosity, namely, the percentage of air in a cubic inch of a porous mold portion, of the molds 42 and 44 affects the rate of evacuation of the mold cavities and the rate of air cooling of the molds. Consequently, the molds 42 and 44 may be manufactured of any porosity desired to achieve a required cycle time, within practical limits necessary to provide molds of required strength and wear characteristics. Any porosity of the molds which permits flow of air therethrough to and from the mold cavities will have a beneficial effect on cycle times. In a preferred embodiment of the invention, a porous portion of a powdered metal mold is of approximately 45% porosity utilizing metal particles of a diameter of approximately 0.025".

By virtue of the evacuation of the mold cavities, the time required for blowing a parison 40 into conformity with its mold cavity is not only reduced but the mating surfaces of the lands 116 on the mold sections which meet when the mold sections are engaged may be constructed so that there is substantially no space therebetween when the mold sections are engaged, thus providing a finished article 40b which does not have any discernible mold lines. By virtue of the pre-expansion of the parison 40, which is accomplished by evacuating the mold cavity 54, the internal diameter required in the parison 40 is reduced, thereby permitting the use of smaller parisons in relation to the diameter of the finished article 40b. In many cases, such as the illustrated embodiment of the invention, this permits blow molding of the neck section 104 of the article 40b without any flash. With the method and apparatus of this invention, therefore, hollow plastic articles may be produced at improved rates of speed and of improved quality.

It will be understood that the method and apparatus for blow molding hollow articles which are herein disclosed and described are presented for purposes of explanation and illustration and are not intended to indicate limits of the invention, the scope of which is defined by the following claims.

What is claimed is:

1. In apparatus for blow molding hollow plastic articles which includes means for providing a tubular parison of expandible plastic material and means for injecting a blowing fluid into said parison, a pair of mold sections movable into engagement to form a mold having a cavity which surrounds said parison, said mold sections on opposite sides of said parison being formed of a porous metal, and reversible blower means connected to said mold sections and operable selectively to move air in one direction through said porous metal for drawing air out of said mold cavity or in an opposite direction for supplying cooling air to said mold sections.

2. The method of blow molding hollow articles from a tubular parison of expandible plastic material which comprises forming a mold having a wall defining a cavity which is positioned so that said parison is surrounded by the mold cavity, evacuating sufficient air from said cavity through said mold to partially expand said parison radially outwardly to a position spaced from said wall, and supplying a fluid under pressure to the interior of said parison so as to fully expand it outwardly against said wall into conformity with said cavity.

3. The method of blow molding hollow articles from a tubular parison of expandible plastic material comprising providing a pair of mold sections movable into engagement to form a mold cavity which surrounds said parison, moving said mold sections into engagement so that said parison is surrounded by the mold cavity, evacuating sufficient air from said cavity through said mold sections to partially expand said parison radially outwardly, supplying a fluid under pressure to the interior of said parison so as to fully expand it outwardly into conformity with said cavity, forcing cooling air through said mold sections, and separating said mold sections concurrently with moving air through said mold sections in a direction toward said cavity for separating the expanded parison from said mold sections.

4. The method of blow molding hollow articles from a body having a passage therein adapted to be supplied with a fluid and formed of an expandible plastic material in a mold having portions which are of a sufficient porosity to permit the passage of air therethrough comprising positioning said body in said mold, evacuating sufficient air from said cavity through said mold portions to enlarge said passage, and supplying a fluid under pressure to the enlarged passage in said body so as to expand said body into conformity with said cavity.

5. Blow molding apparatus comprising a plurality of extrusion nozzles adapted to be supplied in turn with plastic in a semi-fluid heated condition for forming in turn at each nozzle a tubular parison of expandible plastic material, a mold for each of said nozzles comprising a plurality of mold sections movable into engagement to form a mold cavity which surrounds the parison at the nozzle, each of said mold sections being provided with an air chamber and each of said sections having a portion thereof between said chamber and said cavity formed of a sintered powdered metal so that said mold portion is of a porous construction permitting a flow of air therethrough between said mold cavity and said air chamber, a reversible blower, and valve means connected to said blower and to the air chamber for each of said mold sections, said valve means being movable to a plurality of positions for selectively communicating the air chambers for each of said molds and said blower.

References Cited in the file of this patent
UNITED STATES PATENTS 1,592,536    O'Neill _____ July 13, 1926